United States Patent
Lathrop et al.

(10) Patent No.: US 10,300,930 B2
(45) Date of Patent: *May 28, 2019

(54) GEOFENCING FOR AUTO DRIVE ROUTE PLANNING

(71) Applicants: Volkswagen AG, Wolfsburg (DE); Audi AG, Ingolstadt (DE)

(72) Inventors: William Brian Lathrop, San Jose, CA (US); Nathaniel Paffett-Lugassy, San Francisco, CA (US)

(73) Assignees: Volkswagen AG (DE); Audi AG (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/604,248

(22) Filed: May 24, 2017

(65) Prior Publication Data

US 2017/0259832 A1 Sep. 14, 2017

Related U.S. Application Data

(63) Continuation of application No. 15/064,219, filed on Mar. 8, 2016, now Pat. No. 9,688,288.

(51) Int. Cl.
*B60W 30/00* (2006.01)
*B60W 30/12* (2006.01)
(Continued)

(52) U.S. Cl.
CPC ......... *B60W 50/14* (2013.01); *G01C 21/3461* (2013.01); *G01C 21/3697* (2013.01); *G05D 1/0061* (2013.01); *G05D 2201/0213* (2013.01)

(58) Field of Classification Search
CPC ....... B60W 50/00; B60W 50/14; G01C 21/00; G01C 21/34; G01C 21/36; G01C 21/3461; G01C 21/3697; G05D 1/00; G05D 1/0061
See application file for complete search history.

(56) References Cited

U.S. PATENT DOCUMENTS

| | | |
|---|---|---|
| 8,321,067 B1 | 11/2012 | Prada Gomez et al. |
| 8,874,301 B1 | 10/2014 | Rao et al. |

(Continued)

FOREIGN PATENT DOCUMENTS

| | | |
|---|---|---|
| EP | 2916190 A1 | 9/2015 |
| EP | 2921363 A1 | 9/2015 |
| WO | 2015049231 A1 | 4/2015 |

*Primary Examiner* — Yonel Beaulieu
(74) *Attorney, Agent, or Firm* — Barnes & Thornburg LLP

(57) ABSTRACT

A system of a semi-autonomous driving vehicle for transitioning from a semi-autonomous driving mode to a manual driving mode. A navigation system to determine a route to a destination. A vehicle head unit to receive data that comprises information related to a geographic zone in which autonomous driving is discouraged or prohibited along the determined route to the destination. A processor to process the received data to determine if the semi-autonomous driving vehicle in autonomous mode is approaching a geographic zone in which autonomous driving is discouraged or prohibited. The semi-autonomous driving vehicle issues a notification to the driver of the semi-autonomous driving vehicle requesting the driver to manually drive the semi-autonomous driving vehicle in response to a determination that the semi-autonomous driving vehicle is approaching the geographic zone in which autonomous driving is discouraged or prohibited.

18 Claims, 8 Drawing Sheets

(51) Int. Cl.
  *B60W 30/16* (2012.01)
  *B60W 50/00* (2006.01)
  *B60W 50/14* (2012.01)
  *B60K 28/06* (2006.01)
  *G01C 21/26* (2006.01)
  *G01C 21/34* (2006.01)
  *G05D 1/00* (2006.01)
  *G01C 21/36* (2006.01)

(56) References Cited

U.S. PATENT DOCUMENTS

| | | |
|---|---|---|
| 9,031,732 B1 | 5/2015 | Cudak et al. |
| 9,037,337 B1 | 5/2015 | Cudak et al. |
| 9,904,286 B2 * | 2/2018 | Kozak .................. B60W 30/00 |
| 2012/0046818 A1 | 2/2012 | Nettleton et al. |
| 2015/0241878 A1 | 8/2015 | Crombez et al. |

* cited by examiner

GEOFENCING FOR AUTO DRIVE ROUTE PLANNING

CROSS-REFERENCE TO RELATED APPLICATION

This patent application is a continuation application of U.S. patent application Ser. No. 15/064,219, filed Mar. 8, 2016, issued as U.S. Pat. No. 9,688.288, the contents of which are incorporated herein by reference in its entirety.

BACKGROUND

The present disclosure relates to systems, components, and methodologies for driving of a semi-autonomous vehicle. More particularly, the present disclosure relates to systems, components, and methodologies that improve the safety of a semi-autonomous vehicle in areas such as areas that have high vehicle-pedestrian interaction.

SUMMARY

According to the present disclosure, systems, components, and methodologies are provided for driving of a semi-autonomous vehicle to improve safety of the semi-autonomous vehicle.

In illustrative embodiments, a semi-autonomous vehicle may operate in an autonomous driving mode to reach a destination specified by a driver. There may be geographic zones in which autonomous driving is discouraged or prohibited (referred to herein as "geofences").

In at least one embodiment, the semi-autonomous vehicle may use a notification system in order to request a driver to perform manual driving within a geofence. If the driver is in no condition to perform manual driving or does not assume control of the driving, then the semi-autonomous vehicle may perform minimal risk maneuver in order to avoid autonomous driving within a geofence.

In another embodiment, the semi-autonomous vehicle may reroute to the destination to avoid the geofence.

In illustrative embodiments, virtual roadway networks may be constructed of autonomous and non-autonomous segments may be defined by the geofences. Where some of these segments may be fixed and the others may be moving. Each segment may have a fixed length depending on a variety of parameters. The semi-autonomous vehicle may use these segments as transition points to switch from an autonomous driving mode to a manual driving mode by the driver.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a diagrammatic view of a semi-autonomous vehicle interacting with a beacon system, geographic zones database, network, and human-machine interface to collect data on geographic zones in which autonomous driving is discouraged or prohibited, the vehicle having an autonomous driving system in accordance with the present disclosure, and shows that the autonomous driving system includes a driving mode transition system to ensure autonomous driving occurs only outside of geographic zones in which autonomous driving is discouraged or prohibited;

Figure 7:
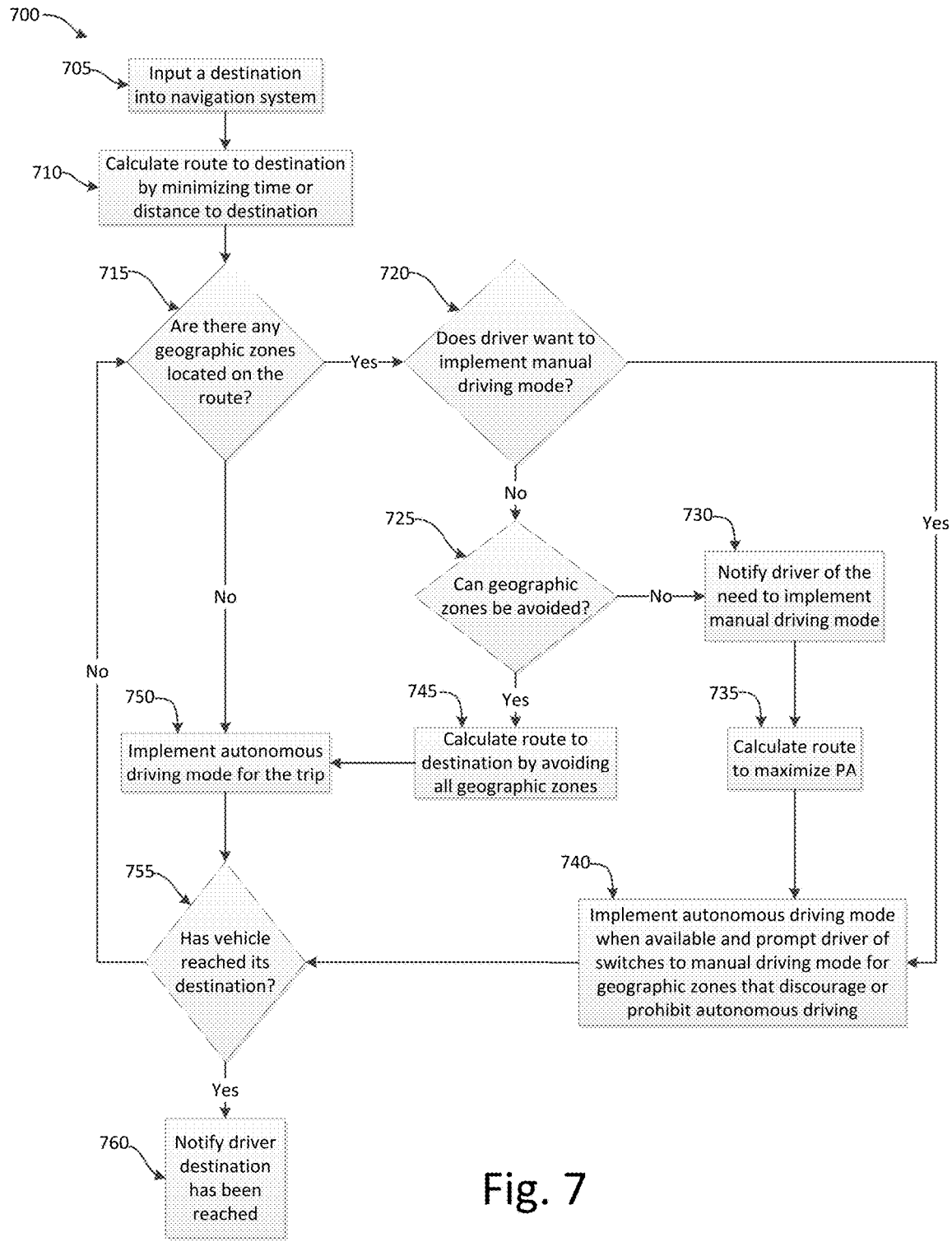
Figure 8:
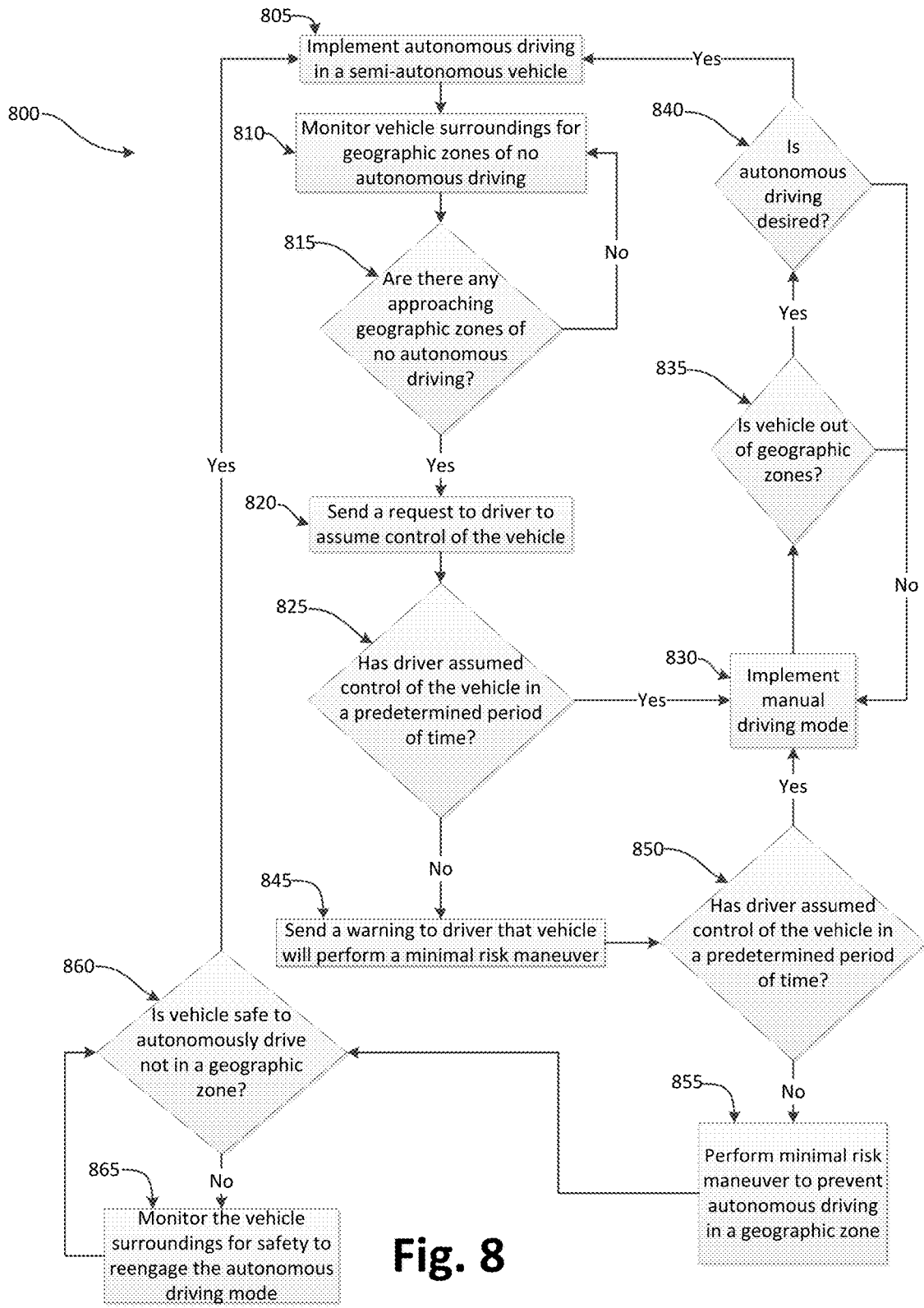

FIG. 7 is a flow diagram illustrating the methodology on how a semi-autonomous vehicle calculates routes to a destination and implements geographic zones into the route while constantly updating to ensure geographic zones are implemented into the route to the destination in accordance with the present disclosure; and FIG. 8 is a flow diagram illustrating the methodology on how a semi-autonomous vehicle transitions from an autonomous driving mode to a manual driving mode in accordance with the present disclosure.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

According to certain illustrative embodiments, a system and method may be used to plan and optimize a route to a destination(s) that one will travel to in a semi-autonomous (or fully autonomous) vehicle (e.g., an Automatic Driving Route Planning Application (ADRPA)). Importantly, route optimization for standard navigation systems may typically refer to the parameters of travel time and/or distance, and reduction thereof. It may also refer to such requirements as freeway and toll road avoidance, or even the desire to travel on a scenic route.

In the context of certain illustrative embodiments, route optimization may include a parameter of percent of the route that can be driven autonomously. For purposes of the following discussion, this will be referred to as Percent Autonomous (PA). PA may be an important decision parameter for the driver of a semi-autonomous vehicle because it is very likely that all possible routes between two locations cannot be driven 100% autonomously. That is, the data which semi-autonomous vehicles might use in order to drive and navigate automatically through an environment may not exist for one or more of the constituent segments of roadway that comprise a route. This may be the result of: (1) the data having never been collected and stored into a database for subsequent use by automated vehicles; (2) the data that was collected was not of sufficient quality for subsequent use by automated vehicles; and/or (3) the data that was collected for subsequent use by automated vehicles is no longer useful because the physical characteristics of the terrestrial roadway on which the data is based are no longer visible, or rather, obscured by dynamic environmental elements (e.g., snow, rain, or ice covers the roadway). It also might be the case that the data was collected and is sufficient, but it is illegal to drive on the segment of road (e.g., school zone; private road).

Presently disclosed embodiments may rely on a variety of data for purposes of route planning and optimization for a semi-autonomous vehicle. This data may come from a variety of sources (e.g., aerial, satellite, and terrestrial laser scans and photography, etc.). One technical application of this data within the context of automatic driving may be for positioning, orienting, and navigating the vehicle during autonomous driving, which requires an accurate representation of the surrounding environment with respect to roads, buildings, structures, mountains, etc. A second important technical application of this data may be for route planning and optimization. For example, there may be multiple routes available from a starting location to a specific destination location.

In at least one illustrative embodiment, further data may be collected in relation to geographic zones in which autonomous driving is discouraged or prohibited (e.g., geofences). The term "geofences" refers to geographic zones in which autonomous driving is discouraged or prohibited. Thus, geofence data may define the areas in which a semi-autonomous vehicle may not be driven in autonomous driving mode (e.g., school zones, government buildings, neighborhoods, private parking lots, etc.).

In accordance with disclosed embodiments, semi-autonomous vehicles may prevent activation of autonomous driving mode if it is determined that it is approaching a geofence within a predetermined period of time or it is inside the area of a geofence. Geofence data analyzed in making such a determination may come from a variety of sources (e.g., database of geographic zones, human-machine interface, network, beacon system, etc.).

Figure 1:
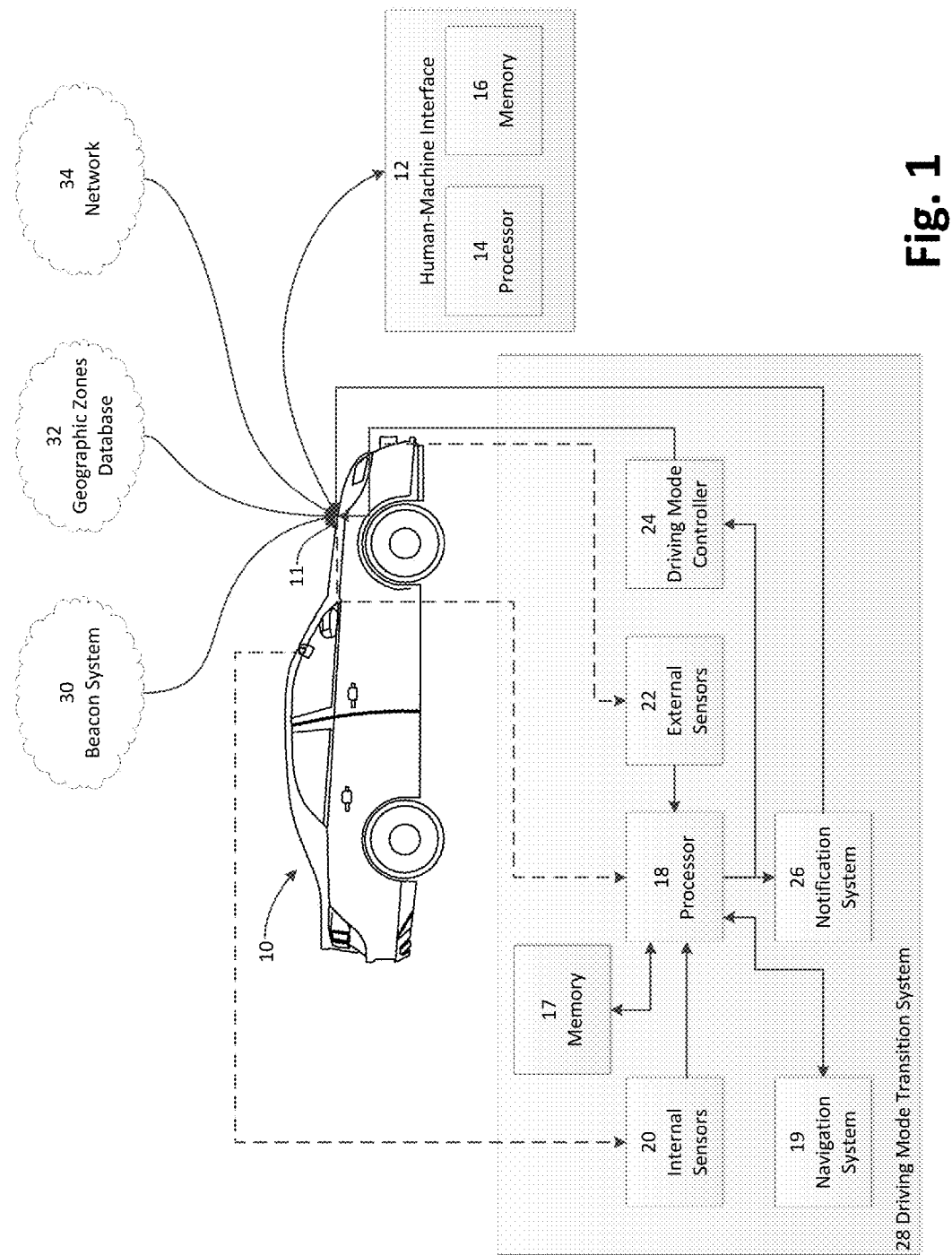

FIG. 1 provides a diagrammatical view of an illustratively embodied semi-autonomous vehicle 10 includes a vehicle head unit 11 and a driving mode transition system 28 that comprises memory 17, processor 18, navigation system 19, internal sensors 20, external sensors 22, driving mode controller 24, and notification system 26 in accordance with the present disclosure. The internal sensors 20 and the external sensors 22 may be electrically coupled to the processor 18. The internal sensors 20 may be embodied as microphones, cameras, etc. The external sensors 22 may be embodied as cameras, Lidar, etc. The processor 18 may further be electrically coupled to the vehicle head unit 11, the memory 17, the navigation system 19, the driving mode controller 24, and the notification system 26. In an illustrative embodiment, the connections between components 11, 17, 18, 19, 20, 22, 24, 26 may be wired or wireless. The memory 17 may be used to store geofence data and processed geofence data in accordance with the present disclosure. The semi-autonomous vehicle 10 may receive data from at least one of a plurality of sources such as a human-machine interface 12, a beacon system 30, a geographic zones (geofence) database 32, and a network 34. However, the semi-autonomous vehicle 10 may also receive data from other sources as well. The human-machine interface 12 may be embodied as a computer, a laptop, a tablet computer, a smartphone, etc.

The illustrative embodied semi-autonomous vehicle 10 may be driven in at least two different driving modes. One driving mode may be an autonomous driving mode where the semi-autonomous vehicle 10 may drive in place of an operator without aid of the operator. The semi-autonomous vehicle 10 may accomplish autonomous driving in accordance with the present disclosure. Another driving mode may be a manual driving mode where the operator of the semi-autonomous vehicle 10 is the driver of the vehicle. Manual driving mode may be a driver controlling the semi-autonomous vehicle 10 in every driving function. Manual driving mode may also include functions to be performed by the semi-autonomous vehicle 10 such as pedestrian warning, collision avoidance, other emergency reactions, etc. In an illustrative embodiment, a driving mode available within a geofence may be where a semi-autonomous vehicle 10 is able to control parameters of driving such as speed of the vehicle when the driver assumes control of operation of the semi-autonomous vehicle 10.

In an illustrative embodiment, the semi-autonomous vehicle 10 receives at the vehicle head unit 11 geofence data from at least one of the beacon system 30, the geographic zones database 32, the network 34, or the human-machine interface 12 in accordance with the present disclosure. The semi-autonomous vehicle 10 may also receive geofence data from a combination of sources. The semi-autonomous vehicle 10 may process the geofence data received from the vehicle head unit 11 with a processor 18 to populate the navigation system 19 with geofences in accordance with the present disclosure.

In an illustrative embodiment, the geographic zones database 32 may be created and maintained on one or more servers coupled to one or more networks 34 to communicate with the semi-autonomous vehicle 10 to provide geofence data; alternatively, that data may be stored on-board of a vehicle's navigation system 19 in memory 17.

In still a further illustrative embodiment, an application on the human-machine interface 12 may communicate with the semi-autonomous vehicle 10 to provide geofence data. In another illustrative embodiment, a semi-autonomous vehicle 10 may communicate with other semi-autonomous vehicles 10 to gather geofence data. Still further, geofence data may be broadcast by and received from a beacon system 30 providing geofence data to the semi-autonomous vehicle 10. Such a beacon system 30 may include one or more beacons attached to vehicles, buildings and other mobile or stationary locations. For example, a beacon may be attached to a school bus and may be activated when the school bus arm extends out to force traffic to stop. Thus, the beacon may emit radio frequency signals indicating a geofence within an area surrounding the school bus while the school bus arm and blinker signals are activated to create a geofence. Such functionality provides technical utility specific to the application of semi-autonomous driving because the area around a school bus during boarding and unboarding may be chaotic; as a result, autonomous driving may be discouraged or prohibited.

In another example, a beacon may be attached to a tow truck and may be activated to create a geofence because the area around a tow truck loading may be unpredictable, for example, because of the likely location of a broken down vehicle (which is often to the side of but in close proximity to travel lanes) or a vehicle that has suffered a collision (which is often impeding travel lanes). As a result, autonomous driving may be discouraged or prohibited in such situations because of unusual, inconsistent or erratic traffic patterns likely present in the area around the tow truck.

In a further example, a beacon may be attached to emergency vehicles and may be activated when the emergency vehicle is utilizing its audible and/or visual warning devices (e.g., siren and lights). Alternatively, the beacon may be attached to police vehicles and activated in response to an indication that the vehicle is in active pursuit of another vehicle or responding to an emergency call; such indication may be provided via interaction with a human machine interface 12 in the semi-autonomous vehicle 10 by a driver of the semi-autonomous vehicle 10. The creation of the geofence may discourage or prohibit autonomous driving as the semi-autonomous vehicle 10 is approaching an emergency vehicle because areas around an emergency vehicle may be unpredictable. Road construction equipment may be equipped with beacons to generate geofences when in use to discourage or prohibit autonomous driving of the semi-autonomous vehicle 10 because of the chaotic nature of the areas surrounding road construction equipment. Other semi-autonomous vehicles 10 may have the beacons equipped and may communicate with one another to provide geofence data. For example, in accordance with at least one embodiment, if multiple semi-autonomous vehicles 10 in a geographic area have their hazard lights on, that may indicate an unusual situation which may trigger creation of a geofence to discourage or prohibit autonomous driving in that geographic area. In one implementation of such an embodiment, each semi-autonomous vehicle 10 may transmit a signal indicating that the vehicle has its hazard lights on and a semi-autonomous vehicle 10 may evaluate the situation and determine if there is a potential geofence to discourage or prohibit autonomous driving based on factors such as weather, amount of semi-autonomous vehicles 10 with hazards on, if semi-autonomous vehicles 10 are in manual driving mode or in autonomous driving mode, speed of the vehicles, and/or other traffic conditions.

In an illustrative embodiment, geofences may be static, dynamic, stationary, and/or mobile. An example of a static geofence may be a geographic zone in which autonomous driving is discouraged or prohibited surrounding a military or government complex to increase safety. An example of a dynamic geofence may be a geographic zone in which autonomous driving is discouraged or prohibited during certain times of the day such as a school zone because school zones may have unpredictable situations that may occur like a child running into the street. An example of a stationary dynamic geofence may be a scene of an accident in which autonomous driving is discouraged or prohibited because other vehicles may act in an unpredictable manner around the scene of the accident. An example of a mobile dynamic geofence may be a firetruck that is deployed to a scene of a fire in which autonomous driving is discouraged or prohibited in an area around the firetruck because the law may require vehicles to pull over for emergency vehicles to pass.

In an illustrative embodiment, data related to geofences may comprise at least one of a plurality of parameters including the dimensions, e.g., size of the geofence and its location. The geofence may vary in size depending on the situation that is discouraging or prohibiting autonomous driving. For example, if there is a geofence for a public event like a marathon in a city and the size of the geofence may be reduced as time passes because the area in which marathon runners are located will change and/or be reduced over time. The geofence data may comprise time of activation and deactivation of a geofence. For example, the geofence may be activated and deactivated during certain times of the day such as described above for a school zone. In another example, roadways during peak hours may have geofences as well because of the unpredictable environment of a high traffic environment. The geofence data may comprise distance from the geofence. The distance from the geofence may be used by a semi-autonomous vehicle 10 to transition from autonomous driving mode to a manual driving mode.

In the case of a mobile geofence, the geofence data may include the direction the mobile geofence is moving. The semi-autonomous vehicle 10 may assess if it needs to transition to manual driving mode from an autonomous driving mode if a mobile geofence is moving toward the semi-autonomous vehicle 10. The geofence data may comprise the shape or area of the geofence. For example, the geofence area may be a stretch of road that discourages or prohibits driving in autonomous mode by semi-autonomous vehicles 10. In another example, the geofence area may be a shape around a center point of a location on a map that discourages or prohibits driving in autonomous mode by semi-autonomous vehicles 10. The geofence data may include other parameters not mentioned here that may be beneficial for a semi-autonomous vehicle 10 to properly evaluate if there needs to be a transition from autonomous driving mode to manual driving mode.

In an illustrative embodiment, geofences may define virtual roadway networks constructed of autonomous and non-autonomous segments, with some segments fixed and others moving around. Each of the segments may have a fixed length depending on a plurality of parameters. Each segment may be static, dynamic, stationary, and/or mobile. The end points of each segment may comprise a location trigger that once crossed may initiate a transition-of-control or a transition from an autonomous driving mode to a manual driving mode or manual driving mode to autonomous driving mode. The end points may be defined as a geospatial coordinate or array of geospatial coordinates. The geospatial coordinates or array of geospatial coordinates may be stored or dynamically uploaded in the on-board database of the semi-autonomous vehicle's 10 navigation system 19 or in a server to communicate with the semi-autonomous vehicle's 10 navigation system 19. The geographic zones database 32 may contain constant and variable memory depending on the nature of the segment type being defined by the stored coordinates such as if the segment is static, dynamic, stationary, and/or mobile. The constant memory may have permanent stored coordinates and the variable memory may have coordinates that are dynamic.

In an illustrative embodiment, the geographic zones database 32 may be within google map layers. There may be individual layers for these virtual fences that depend on whether the geofence is of a variable type, for example, a geofence of an emergency vehicle, or constant type, for example a geofence around a private parking lot. There may be additional layers connected to the class of semi-autonomous vehicles 10. The class of the semi-autonomous vehicle 10 may comprise an assessment of the quality of their sensor suites, processing and control algorithms, function capability, and general vehicle performance. A semi-autonomous vehicle 10 may operate via a geofence map that is conservative in nature if the vehicle measures low on its class. For example, a conservative nature may describe a semi-autonomous vehicle 10 that may not operate in school zones, residential areas, parking lots, etc. However, if the class of the semi-autonomous vehicle 10 measures high then it may operate in school zones, residential areas, parking lots, etc.

Layer configurations may be a function of data types, vehicle types, driving records, etc. Each layer may be simply a database of geospatial coordinates of the geographic zones database 32 that are used to trigger a transition-of-control between the semi-autonomous vehicle 10 and a human operator.

In an illustrative embodiment, a system for controlling and orchestrating driving mode transitions from autonomous driving mode to manual driving mode may include a vehicle with automation technology, a geospatial database of the geographic zones database 32, positioning system, navigation system 19, human-machine interface 12, administrative system, and a communications device. The geospatial database of the geographic zones database 32 may be stored on-board the vehicle's navigation system 19 in a memory 17 or in a server as described above. If the geospatial database of the geographic zones database 32 is stored in a server, the geospatial coordinates defining the location triggers for the geofence may be transmitted continuously to the vehicle's automation technology. In an illustrative embodiment, the geospatial database of the geographic zones database 32 contains the coordinates of all geofence location triggers including those for the static, dynamic, stationary, mobile, and combinations thereof. The positioning system may be used to calculate the time-to-cross the geospatial location trigger. The navigation system 19 of the semi-autonomous vehicle 10 may aggregate all of the geospatial location triggers or geofences into a single virtual representation of the surrounding driving environment.

Upon crossing a geofence, a message may be sent from the navigation system 19 to the semi-autonomous vehicle's 10 processor 18 of the automation system that will execute the necessary on-board procedures to transition from automatic driving mode to manual driving mode. The on-board procedures may include capturing the driver's attention to get the driver back in the loop, detecting steering wheel and brake/throttle engagement, and detecting operator control. The on-board procedures may be done through the semi-autonomous vehicle's 10 human-machine interface 12. After successful detection of these events, the system may stop its automation and hand over control to the human operator to switch from autonomous driving mode to manual driving mode.

In an illustrative embodiment, the administrative system may be the infrastructure that would be required to realize such a network of geofences (i.e., NHTSA, SAE, or other Government entity). The administrative system may be responsible for defining where geofences may be placed and where they should not be placed. These requirements may then be used to populate a geographic zones database 32. The administrative system may be responsible to coordinate the continuous populating and de-populating the dynamic and moving geofences. The dynamic and moving geofences may require a communication device/application that can send the geospatial coordinates of a new or changing position of any geofence. For example, police cars, ambulances, fire trucks, construction vehicles, and high-value targets may have a transponder that transmits their changing position to the administrative system that would then dynamically populate the geospatial database of a geographic zones database 32. Similar messages may be sent from a semi-autonomous vehicle's 10 system upon the detection of a collision. For example, a dynamic geofence may be set around an accident scene.

In an illustrative embodiment, the semi-autonomous vehicle 10 may include and utilize predictive software that analyzes the geofence data received. The geofence data received may be stored in a local memory 17 of the semi-autonomous vehicle 10 to be processed or there may be preprocessing before the semi-autonomous vehicle 10 receives the geofence data from a data source. For example, the geographic zones database 32 data may be utilized by artificial intelligence to perform learning to understand when certain areas are likely to have many pedestrians/bicyclists on the roadway such as around a sporting/public event, lunch time in a dense urban environment, poor road conditions due to weather, a predicted riot, etc. The learning may be used to predict geofences that go into the route generation. The predicted geofences may be determined from areas or stretch of roads that frequently have geofences and other factors that would discourage or prohibit autonomous driving in the area or stretch of road. The learning may also be done by the semi-autonomous vehicle 10 or human-machine interface 12 or any other data source instead of the geographic zones database 32.

In an illustrative embodiment, a memory 17 of the semi-autonomous vehicle 10 may be used to support the function of learning, for example, receiving data from a number of different sources in order to understand the driver's preferences with driving. For example, the semi-autonomous vehicle 10 may store to memory 17 that the driver frequently wants to have a completely autonomous route to a destination and the semi-autonomous vehicle 10 may automatically reroute to avoid dynamic mobile geofences. In an illustrative embodiment, a settings profile may be stored to memory 17 to set preferences such as automatic rerouting in the instance of coming into contact with a dynamic mobile geofence.

In an illustrative embodiment, the semi-autonomous vehicle 10 may receive route data from human-machine interface 12 and/or network 34. The route data provides at least one of a plurality of routes to a destination given a starting point for the semi-autonomous vehicle 10. The starting point may be the current location of the semi-autonomous vehicle 10 or an arbitrary point. The human-machine interface 12 may include a processor 14 and a memory 16. The human-machine interface 12 may collect geofence data and process the data to provide the semi-autonomous vehicle 10 navigation data including the geofences on the route. The human-machine interface 12 may store the route to the memory 16 to send to the semi-autonomous vehicle 10. In addition, the human-machine interface 12 may store geofence data in memory 16 to be sent to semi-autonomous vehicle 10. The processing of the geofence data may occur on the human-machine interface 12 or the semi-autonomous vehicle 10.

In an illustrative embodiment, the driving mode transition system 28 may be used to assess if a transition of the driving mode may need to occur. The semi-autonomous vehicle 10 may determine it needs to take operation of the vehicle if it determines the driver is not in a capacity to drive. The semi-autonomous vehicle 10 may perform a transition-of-control in a plurality of situations.

In an illustrative embodiment, the driving mode transition system 28 may use geofence data to assess if a transition-of-control is necessary. If a semi-autonomous vehicle 10 approaches a geofence, it may want to perform a transition-of-control to avoid autonomous driving in a geographic zone in which autonomous driving is discouraged or prohibited.

The semi-autonomous vehicle 10 may use the geofence data received at the vehicle head unit 11 to update the navigation system 19 to include areas or stretch of roads in which autonomous driving mode is not allowed. In an illustrative embodiment, the semi-autonomous vehicle 10 may transition to manual driving mode as the semi-autonomous vehicle 10 crosses a geofence.

In an illustrative embodiment, the driving mode transition system 28 may use a notification system 26 in order to communicate with the driver of the semi-autonomous vehicle 10 that a transition-of-control will occur. The driving mode transition system 28 may begin the procedure to perform a transition-of-control at a predetermined distance to a geofence or predetermined projected time to a geofence in accordance with the present disclosure. The procedure may include using the notification system 26 to notify the driver that there will be a transition-of-control from autonomous driving mode to a manual driving mode. The procedure may include using the notification system 26 to request the driver to assume control of the semi-autonomous vehicle 10 to perform manual driving mode for areas located inside a geofence. The procedure may further include using the notification system 26 to warn the driver after the semi-autonomous vehicle 10 has crossed a predetermined distance to the geofence or predetermined projected time to a geofence that a minimal-risk maneuver will be performed if the driver does not assume control of the semi-autonomous vehicle 10. The minimal-risk maneuver may be an action the semi-autonomous vehicle 10 performs in order to achieve a state where the semi-autonomous vehicle 10 is parked. For example, the minimal-risk maneuver may be the semi-autonomous vehicle 10 pulling over in order to prevent autonomous driving inside a geofence. In another example, the minimal-risk maneuver may also be performing an automated safe stop of the semi-autonomous vehicle 10 in the current lane and putting on the hazards. In another embodiment, the semi-autonomous vehicle 10 may reroute to navigate around the geofence if the driver does not respond. If the semi-autonomous vehicle 10 determines that the driver will not be able to assume control or will not assume control of the semi-autonomous vehicle 10, the driving mode controller 24 will switch the semi-autonomous vehicle 10 from autonomous driving mode to manual driving mode after performing a minimal risk maneuver. The driving mode controller 24 may also switch the semi-autonomous vehicle 10 from manual driving mode to autonomous driving mode if it is determined safe to initiate autonomous driving mode. In an illustrative embodiment, the driver may be required to engage the autonomous driving mode of the semi-autonomous vehicle 10 by performing a deliberate action such as press a button, simply remove hands and feet away from the steering wheel and brake/throttle, etc.

In an illustrative embodiment, the semi-autonomous vehicle 10 may use the internal sensors 20 in conjunction with external sensors 22 in order to determine if the driver is in a state to drive in manual driving mode. For example, the internal sensors 20 may be used in order to determine if the driver is in a state of exhaustion and may not take control of the semi-autonomous vehicle 10 approaching a geofence. In another example, the external sensors 22 may be used to determine that autonomous driving mode should not be implemented such as during a severe storm or during bad road conditions. The combination of the internal sensors 20 and external sensors 22 may be used to determine whether or not the semi-autonomous vehicle 10 or the driver should assume control of operating the semi-autonomous vehicle 10. The semi-autonomous vehicle 10 may perform a minimal risk maneuver if it is determined both the semi-autonomous vehicle 10 and the driver should not assume control of operating the semi-autonomous vehicle 10.

Figure 2:
FIG. 2 is an exemplary driving route map generated and displayed in accordance with the present disclosure detailing what percentage of the route can be driven autonomously.

FIG. 2 depicts an image of a map 200 of an area surrounding the semi-autonomous vehicle 10. The map 200 displays a current position of the semi-autonomous vehicle 10 and a destination 208. The map 200 also includes a plurality of routes 202, 204, 206 from a current position of the semi-autonomous vehicle 10 to the destination 208. The map 200 may be displayed on a display screen (e.g., navigation system 19 display screen, dedicated in-vehicle display screen, dashboard mounted display screen, heads-up display, human-machine interface 12 display screen, etc.) according to certain illustrative embodiments. In the illustrative embodied map 200, three routes 202, 204, 206 are provided. However, there may be any number of suitable routes provided from the current position of the semi-autonomous vehicle 10 to the destination 208. Each route 202, 204, 206 may be generated from a plurality of sources. The semi-autonomous vehicle 10 may generate each of the routes 202, 204, 206 from using data from at least one of the human-machine interface 12, the beacon system 30, the geographic zones database 32, and/or network 34 in accordance with the present disclosure. Each of the routes 202, 204, 206 may have information regarding the distance from semi-autonomous vehicle 10 to destination 208, time to arrive to destination 208, and PA of each route 202, 204, 206. Each of the routes 202, 204, 206 may include further information as appropriate for a driver to decide which route 202, 204, 206 to select to travel to a destination 208. PA of each route 202, 204, 206 may be calculated by determining how many geofences are located on the route 202, 204, 206 and calculating how much of the route can be driven autonomously and how much of the route must be driven in manual driving mode in accordance with the present disclosure.

In an illustrative embodiment, the map 200 includes a legend that may identify the PA value associated with each line format. The routes 202, 204, 206 may comprise road segments with different PA values, and a total PA value may be a weighted average of the combined road segments of each route 202, 204, 206.

In an illustrative embodiment, the routes 202, 204, 206 may include predicted geofences to calculate PA of the routes 202, 204, 206. In another embodiment, the predicted geofences may be presented to the driver as a potential decrement to PA. The predicted geofences may be based on a plurality of factors in accordance with the present disclosure.

Figure 3:
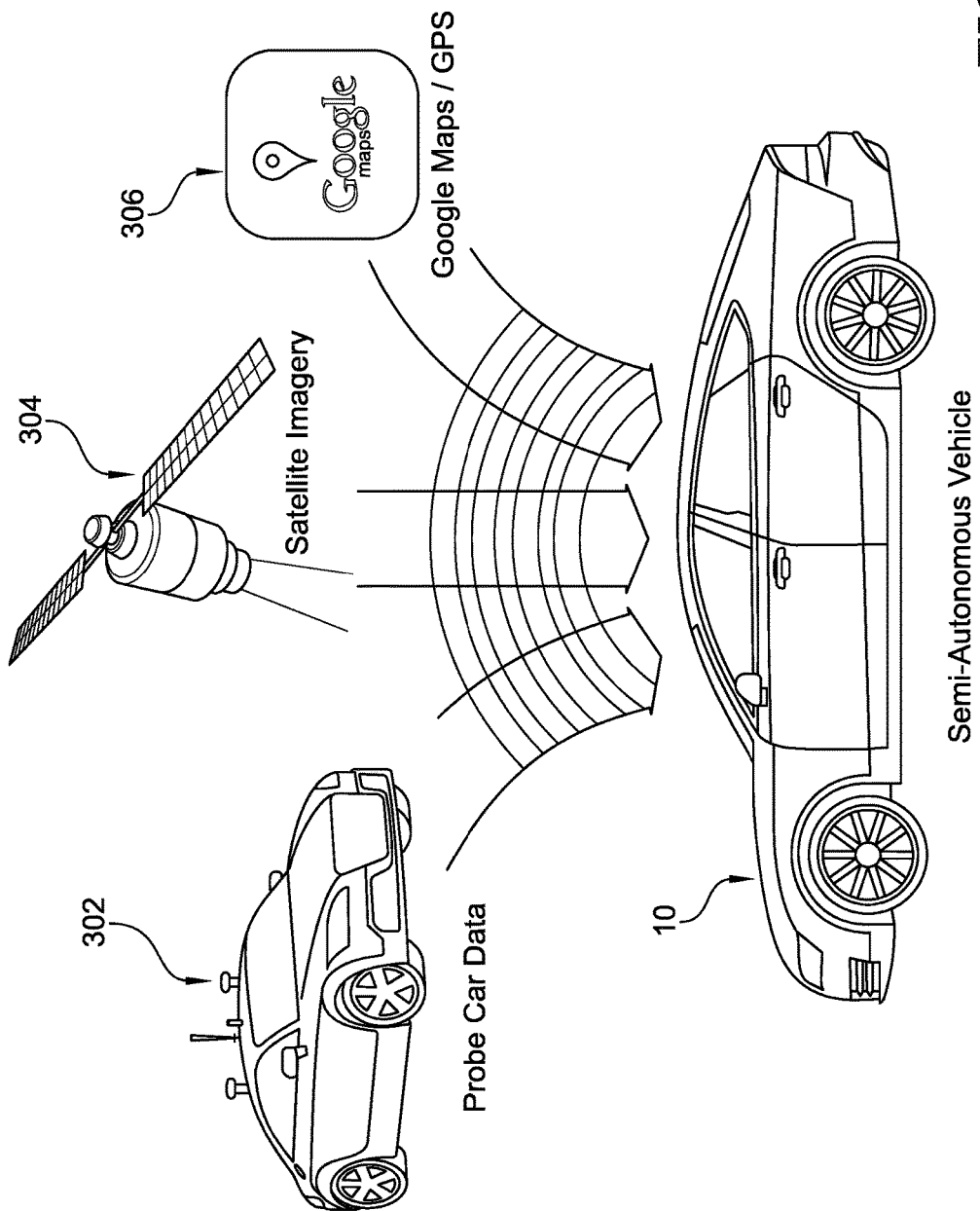
FIG. 3 depicts exemplary data sources that the semi-autonomous vehicle may use in order to gather data related to geographic zones in which autonomous driving is discouraged or prohibited in accordance with the present disclosure.

FIG. 3 depicts sources where a semi-autonomous vehicle 10 may receive data to generate each route. The semi-autonomous vehicle 10 may receive data from at least one of probe cars 302, satellite imagery 304, and data source 306 such as Google Maps, GPS, etc. The entire map 200 of FIG. 2 may have been photographed via satellite 304 or aerial photography. The map 200 may also have been created from a data source/database 306 such as Google Maps, GPS, etc. Probe cars 302 which may have travelled along various routes that comprise the possible routes 202, 204, 206 may collect the data to be used by the semi-autonomous vehicle 10 for autonomous driving mode. The semi-autonomous vehicle 10 may use any combination of the data sources for calculating the PA value for each of the potential routes 202, 204, 206.

Figure 4:
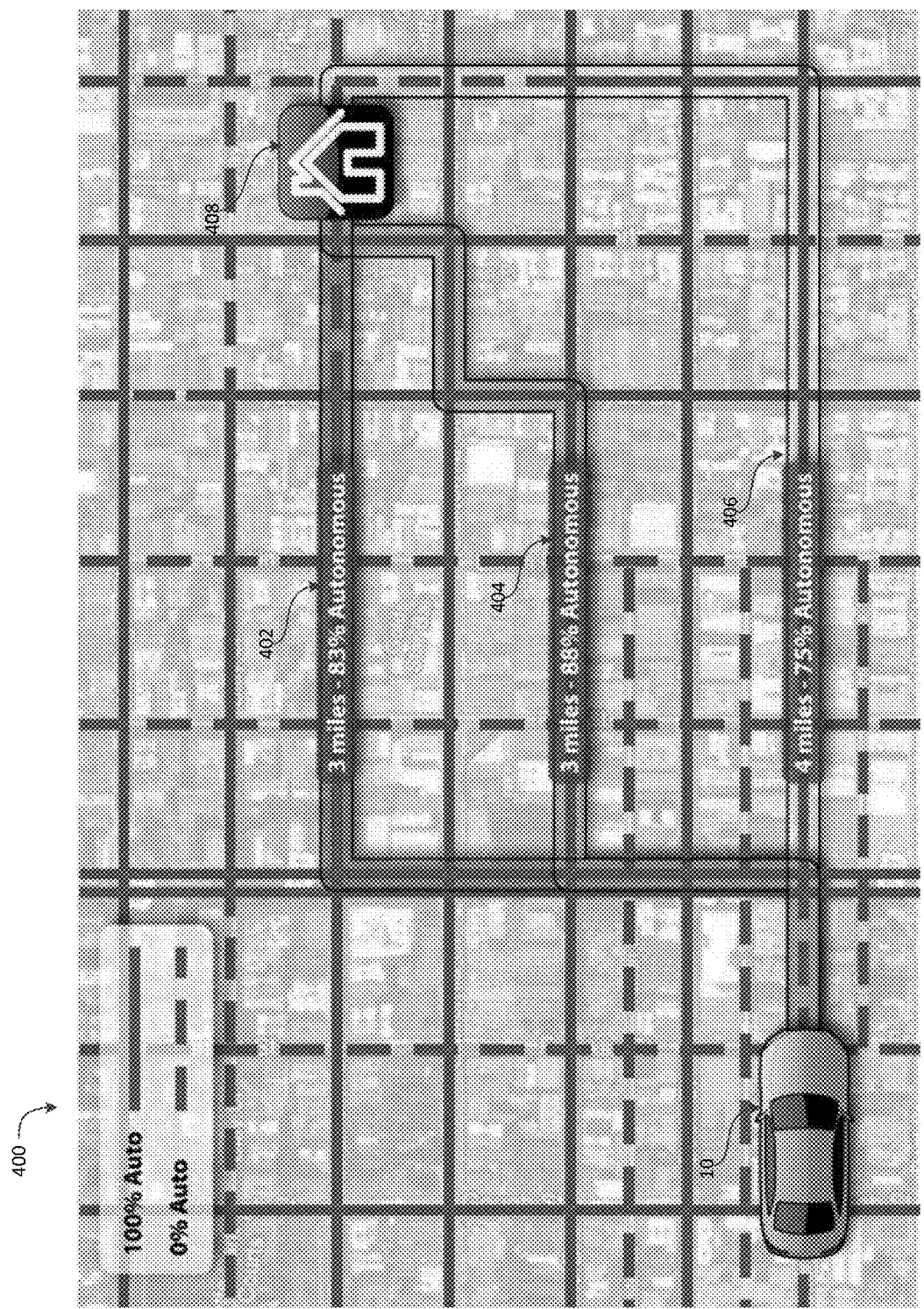
FIG. 4 is another exemplary driving route map generated and displayed in accordance with the present disclosure detailing what percentage of the route can be driven autonomously and detailing which parts of the route are completely autonomous and completely manual driving.

FIG. 4 depicts an image of map 400 similar to the image of map 200 in FIG. 2. The map 400 displays a current position of the semi-autonomous vehicle 10 and a destination 408. The map 400 also includes a plurality of routes 402, 404, 406 from a current position of the semi-autonomous vehicle 10 to the destination 208. In an illustrative embodiment, map 400 contains a legend that may identify the PA value associated with each line value. The routes 402, 404, 406 may comprise road segments with different PA values, and a total PA value may be a weighted average of the combined road segments of each route 402, 404, 406. In the illustrative embodied map 400, the legend identifies two line values as either 100% autonomous or 0% autonomous. The distinction between the identified values between the legend in map 400 and the legend in map 200 may occur in order to simplify the calculations for PA of each route 402, 404, 406. However, in other embodiments the road segments may be given any line value from 0% to 100%. The PA may be calculated from the geofence data the semi-autonomous vehicle 10 receives from at least one of a plurality of sources in accordance with the present disclosure. For example, road segments that a semi-autonomous vehicle 10 may operate in autonomous driving mode would be given a line value of 100% Auto and road segments that a semi-autonomous vehicle 10 is discouraged or prohibited to operate in autonomous driving mode such as within a geofence would be given a line value of 0% Auto.

Figure 5:
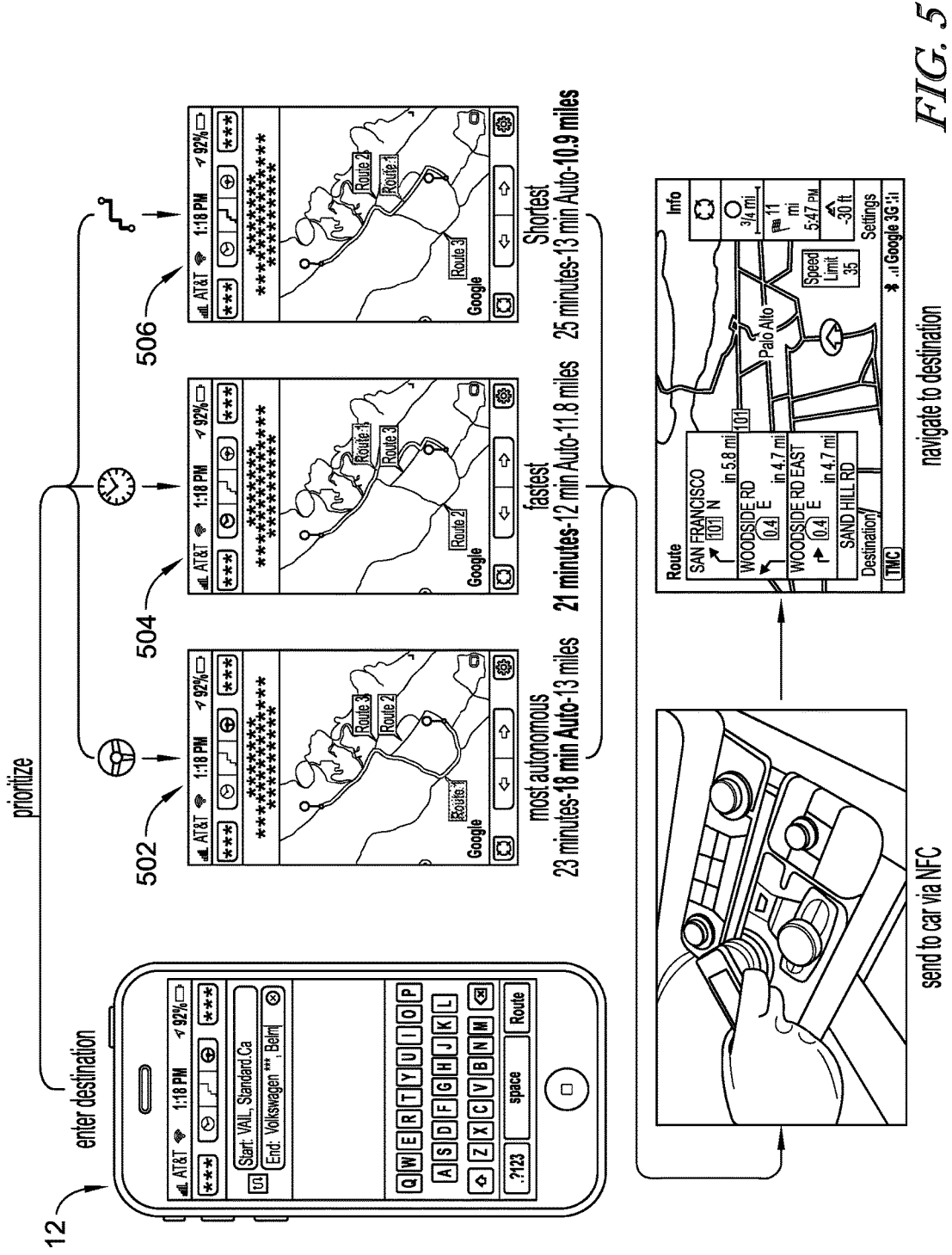
FIG. 5 shows a human-machine interface receiving route information from a user and generating potential routes depending on which is most autonomous, fastest, and/or shortest in accordance with the present disclosure.

FIG. 5 depicts a flow diagram of an example use case of the navigation system 19 of the semi-autonomous vehicle 10 in accordance with the present disclosure. The driver of the semi-autonomous vehicle 10 may be asked to input a destination into the human-machine interface 12. In an illustrative embodiment, the human-machine interface 12 is embodied as a smart phone. However, the human-machine interface 12 may be any interface with which a user may interface with a machine. For example, the human-machine interface 12 may be an interface that is located within the semi-autonomous vehicle 10 to be manipulated by the driver. After a driver inputs a destination into the human-machine interface 12, the human machine interface 12 may generate routes 502, 504, 506 to the destination in accordance with the present disclosure. Each of the routes 502, 504, 506 may be generated to provide a driver with various options depending on several factors. These factors may include the driver's desire to reach the destination in the shortest amount of time, in the shortest distance possible, in such a way to utilize autonomous driving mode the most, or any other factors a driver may decide to select a route to a destination. Each of the routes 502, 504, 506 may display information on each route 502, 504, 506 such as how long it will take to reach the destination, PA of each route 502, 504, 506, how long will the autonomous driving mode be active of the total driving time, what is the distance traveled for the route 502, 504, 506, how far will the semi-autonomous vehicle 10 travel in autonomous driving mode, and/or other information that a driver would like to know about a given route 502, 504, 506.

In an illustrative embodiment, the route 502, 504, 506 may also include information on predicted potential autonomous driving time or predicted potential autonomous driving distance as a result from potential predicted geofences in accordance with the present disclosure. The predicted potential driving time or distance may be included into the actual value or it may be displayed separately.

In an illustrative embodiment, after a route 502, 504, 506 is selected by the driver to reach a destination the human-machine interface 12 may send the route 502, 504, 506 to the semi-autonomous vehicle 10. After the semi-autonomous vehicle 10 receives route 502, 504, 506 information, the semi-autonomous vehicle 10 may either initiate autonomous driving mode as prompted by the driver or the driver may begin in manual driving mode to the destination. The driver may assume control of the semi-autonomous vehicle 10 when desired except when it is determined that the driver is in not in a state to perform manual driving mode in accordance with the present disclosure. After navigating to the destination with autonomous driving and manual driving, the semi-autonomous vehicle 10 may alert the driver of reaching the destination.

Figure 6:
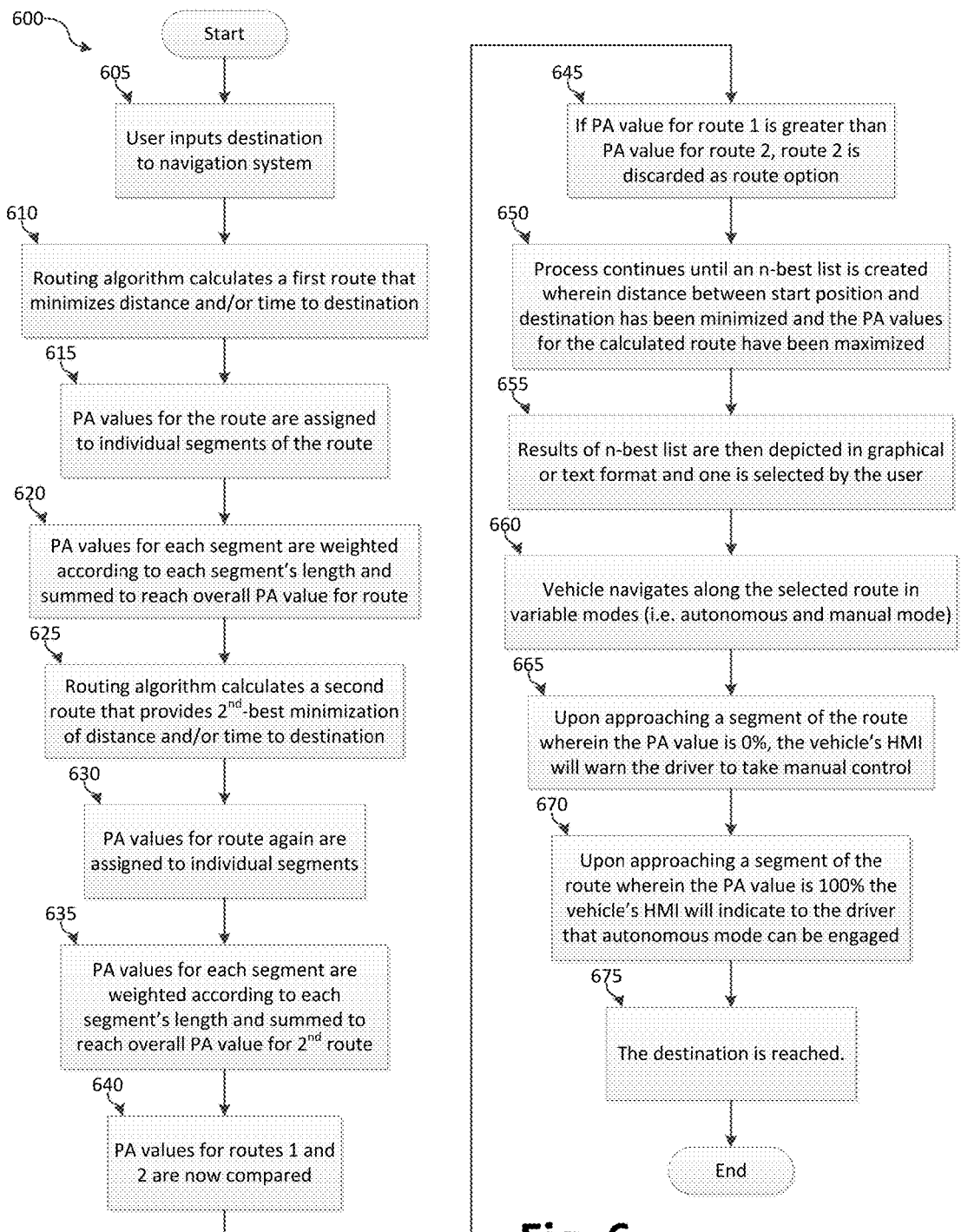
FIG. 6 is a flow diagram illustrating the methodology on how a semi-autonomous vehicle receives destination information and generates several routes to be selected by a user for the vehicle to follow to the destination in accordance with the present disclosure.

FIG. 6 is a flow diagram 600 illustrating a methodology for generating routes for autonomous driving in conjunction with manual driving to arrive at a destination in accordance with the present disclosure. The illustrative embodied methodology begins with operation 605, in which a user or driver may input the destination into the navigation system 19 through the use of the human-machine interface 12 or any other method. After receiving the destination, the process may continue with operation 610 where a routing algorithm may calculate a first route that minimizes distance and/or time to destination. In operation 615, PA values for the route may be assigned to individual segments of the route in accordance with the present disclosure. PA values may be calculated by determining how many geofences are located on the individual segments of the route and how will that affect autonomous driving of the semi-autonomous vehicle 10. In operation 620, PA values for each segment may be weighted according to each segment's length and summed to reach overall PA value for the route. In operation 625, the routing algorithm may calculate a second route that provides $2^{nd}$-best minimization of distance and/or time to destination. In operation 630, PA values for the second route may be assigned to individual segments. In operation 635, PA values for each segment may be weighted according to each segment's length and summed to reach overall PA value for $2^{nd}$ route. In operation 640, the PA values for routes 1 and route 2 may be compared. In operation 645, if the PA value for route 1 is determined to be greater than PA value for route 2 , route 2 may be discarded as a route option. In operation 650, the process may continue until an n-best list is created wherein distance between start position and destination has been minimized and the PA values for the calculated route have been maximized. In operation 655, the results of n-best list may then be depicted in graphical or text format and one may be selected by the user or driver. In operation 660, the semi-autonomous vehicle 10 navigates along the selected route in variable modes such as autonomous driving mode and manual driving mode. In operation 665, when approaching a segment of the route wherein the PA value is 0%, the semi-autonomous vehicle's 10 human-machine interface 12 may warn the driver to take control of operation of the semi-autonomous vehicle 10 for manual driving mode. In operation 670, when approaching a segment of the route wherein the PA value is 100%, the semi-autonomous vehicle's 10 human-machine interface 12 may indicate to the driver that autonomous driving mode may be engaged. In operation 675, the semi-autonomous vehicle 10 arrives to the destination and may notify the driver that the destination has been reached.

FIG. 7 is a flow diagram 700 illustrating a methodology for detecting geographic zones in which autonomous driving is discouraged or prohibited (geofences) and updating the route information with the geofence data. The illustrative embodied methodology begins with operation 705, in which a user or driver may input the destination into the navigation system 19 through the use of the human-machine interface 12 or any other method. After receiving the destination, the process may continue with operation 710 where a route may be calculated to a destination by minimizing time or distance to destination. The flow diagram 600 of FIG. 6 may be used to generate the multiple potential routes in operation 710 to be selected by the user or driver. After a route is selected, operation 715 may check to detect if there are any geofences located on the route to the destination. If there are no geofences located on the route, then the process may continue to operation 750 and the semi-autonomous vehicle 10 may implement autonomous driving mode for the trip if desired in accordance with the present disclosure. The driver may take control of operation of the semi-autonomous vehicle 10 at any given moment if it is determined that the driver is in a state to be able to perform manual driving mode. If there are geofences located on the route, then the process may continue to operation 720 and the semi-autonomous vehicle 10 determines if the driver would like to utilize manual driving mode or prefer an autonomous trip as much as possible. The determination may be conducted by either determining if the driver is in a position for manual driving mode or if there is a setting for a preference for a complete autonomous driving experience or any other way to determine a driver's desire to manually drive the semi-autonomous vehicle 10 in accordance with the present disclosure. If it is determined that the driver would like to use manual driving mode in conjunction with the autonomous driving mode, then the process may continue to operation 740, in which autonomous driving mode may be implemented when possible and manual driving mode may be implemented when autonomous driving mode is not available such as within a geofence. If a driver has a strong preference to not want to use manual driving mode or is determined to not be able to perform manual driving mode, the process may continue to operation 725, where the semi-autonomous vehicle 10 may determine if it is possible to avoid the geofences along the route. If it is possible to avoid the geofences, the process may continue to operation 745, where the semi-autonomous vehicle 10 may reroute to the destination avoiding the geofences that appear on the route. If it is determined that the geofences may not be avoided, then the process may continue to operation 730, where the driver may be notified that there will need to be an implementation of manual driving mode. After the driver is notified, the process may continue to operation 735, where the semi-autonomous vehicle 10 may calculate a route that maximizes PA. The process may continue from operation 735 to operation 740 to implement the autonomous driving mode when possible and instruct the driver to perform manual driving mode when required in accordance with the present disclosure.

In the illustrative embodied methodology 700, after operation 740 or 750 occurs, the process may continue to operation 755, where there may be a check to determine if the semi-autonomous vehicle 10 has reached its destination. If the semi-autonomous vehicle 10 has reached its destination, then the process may continue to operation 760 and the notification system 26 may notify the driver that the destination has been reached. If the semi-autonomous vehicle 10 has not reached its destination, then the process may return to operation 715, where the semi-autonomous vehicle 10 may check to detect any geofences are located on the route. There may be dynamic mobile geofences that appeared on the route since the first implementation of operation 715, and would need an update to ensure the semi-autonomous vehicle 10 does not perform autonomous driving within a geofence. The process may proceed as before and continue through until the semi-autonomous vehicle 10 reaches its destination.

FIG. 8 is a flow diagram 800 illustrating a methodology for monitoring geofences while implementing autonomous driving mode whenever possible in a semi-autonomous vehicle 10 and transitioning to manual driving mode when necessary. The illustrative embodied methodology begins with operation 805, in which semi-autonomous vehicle 10 may implement autonomous driving mode. In an illustrative embodiment, the operation may begin at operation 830 if the driver is implementing manual driving mode. In operation 810, the semi-autonomous vehicle 10 may monitor its surroundings for geofences. After operation 810, the process may continue to operation 815, where there may be a check to detect the geofences. If there are no geofences detected, the process may return to operation 810 to continue to monitor the surroundings for geofences. If there is a geofence detected, the process may continue to operation 820, where a request may be sent by the notification system 26 to request the driver to assume control of the semi-autonomous vehicle 10. After a request is sent to the driver, the process may continue to operation 825, where the semi-autonomous vehicle 10 may determine if the driver has assumed control of the vehicle in a predetermined period of time. If the driver has assumed control of the semi-autonomous vehicle 10, the process may continue to operation 830 and the driver may implement manual driving mode. However, if the driver has not yet assumed control of the semi-autonomous vehicle 10 in a predetermined period of time, then the process may continue to operation 845, where the notification system 26 may send a warning to the driver that the semi-autonomous vehicle 10 will perform a minimal risk maneuver in accordance with the present disclosure. After operation 845, the process may continue to operation 850, where there may be another check to see if the driver has assumed control of the semi-autonomous vehicle 10 in a predetermined period of time. If the driver assumes control of the semi-autonomous vehicle 10, the process may continue to operation 830 and the driver may implement manual driving mode. However, if the driver has not yet assumed control of the semi-autonomous vehicle 10 in a predetermined period of time, then the process may continue to operation 855, where the semi-autonomous vehicle 10 may perform a minimal risk maneuver to prevent autonomous driving within a geofence in accordance with the present disclosure.

In the illustrative embodied methodology 800, after operation 855, the process may continue to operation 860, where the semi-autonomous vehicle 10 may check to determine if it is safe to implement autonomous driving mode outside of the geofence. In an illustrative example, operation 860 may be implemented when the semi-autonomous vehicle 10 performs a minimal risk maneuver after coming into contact with a dynamic mobile geofence. In another embodiment, the semi-autonomous vehicle 10 may reroute to the destination to avoid an approaching geofence if possible in accordance with the present disclosure. If it is determined safe to reengage the autonomous driving mode, the process may return to operation 805, where the semi-autonomous vehicle 10 may reengage the autonomous driving mode to the destination. If it is determined not safe to reengage the autonomous driving mode, the process may continue to operation 865, where the semi-autonomous vehicle 10 may monitor the surroundings for safety to reengage the autonomous driving mode. There may be a continuous monitoring of the semi-autonomous vehicle 10 surroundings until it is determined to be safe to implement autonomous driving mode. In another embodiment, the semi-autonomous vehicle 10 may stop operation until user or driver input is received to continue.

In the illustrative embodied methodology 800, after operation 830, the process may continue to operation 835, where the semi-autonomous vehicle 10 may determine if it is outside of the geofence. If the semi-autonomous vehicle 10 is not outside of the geofence, the process may return to operation 830 to continue use of the manual driving mode. If the semi-autonomous vehicle 10 is located outside of the geofence, the process may continue to operation 840, where the semi-autonomous vehicle 10 may determine if the driver would like to implement autonomous driving mode. If the driver would like to implement autonomous driving mode, then the process may return to operation 805 and the semi-autonomous vehicle 10 may implement autonomous driving mode in accordance with the present disclosure. However, if autonomous driving mode is not desired, then the process may return to operation 830 and continue implementing manual driving mode.

In an illustrative embodiment, the notifications to the driver may be done by the human-machine interface 12 instead of the notification system 26. In an illustrative embodiment, the diving mode transition system 28 may be used to perform a transition-of-control in a situation where a semi-autonomous vehicle 10 determines that manual driving mode must be implemented. The notification system 26 or the human-machine interface 12 may be used to communicate with the driver of the vehicle to assume control in accordance with the present disclosure.

The technical problem that arises when performing autonomous driving mode in a semi-autonomous vehicle 10 may be addressing areas where the semi-autonomous vehicle 10 should not be allowed to drive autonomously and the transition-of-control from the semi-autonomous vehicle 10 to the driver. Areas such as within school zones, residential neighborhoods, parking lots, etc. These areas may be deemed to be unsafe for a semi-autonomous vehicle 10 to perform autonomous driving because the sensor suites and other parameters of the semi-autonomous vehicle 10 may not be sufficient to reliably handle situations in which there are a lot of pedestrians. There may be other situations and or areas where autonomous driving may be discouraged or prohibited. As a result there may be a required transition-of-control of operation of the semi-autonomous vehicle 10 from the semi-autonomous vehicle 10 to the driver.

There are no current solutions to this problem as of yet. Most of the technology in the field is directed to a transition from manual driving to autonomous driving.

The proposed development of geographic zones in which autonomous driving is discouraged or prohibited (geofences) approaches the problem by defining areas where a semi-autonomous vehicle 10 may not drive autonomously and providing a system and method to transition between an autonomous driving mode to a manual driving mode. There will be a geographic zones database 32 where the data for all geofences may be stored and accessed to populate the navigation system 19 of the semi-autonomous vehicle 10 with information on where autonomous driving is discouraged or prohibited. In addition, geofence data may be received at a vehicle head unit 11 of the semi-autonomous vehicle 10 from at least one of a plurality of sources. When the semi-autonomous vehicle 10 approaches a geofence, the semi-autonomous vehicle 10 may use a notification system 26 of a driving mode transition system 28 or a human-machine interface 12 to request the driver to assume control of the semi-autonomous vehicle 10 in accordance with the present disclosure. If the driver assumes control of the semi-autonomous vehicle 10, then manual driving mode may be implemented until the semi-autonomous vehicle 10 is outside of the geofence and the driver reengages the autonomous driving mode. The notification system 26 or the human-machine interface 12 may warn the driver of a minimal risk maneuver being performed if the driver has not assumed control as requested within a predetermined period of time in accordance with the present disclosure. The semi-autonomous vehicle 10 may perform the minimal risk maneuver after a predetermined period of time passes in order to prevent autonomous driving within a geofence in accordance with the present disclosure. As a result, the semi-autonomous vehicle 10 may transition control of the driving to the driver in a manner involving detection of the geofences and requesting the driver to perform manual driving mode when necessary.

As such there would be geographic zones where autonomous driving would be discouraged or prohibited (geofences). These geofences would be areas that semi-autonomous vehicles 10 may require the driver to implement manual driving mode to improve safety of the semi-autonomous vehicle 10 and the safety of the driver.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

The invention claimed is:

1. A system of a semi-autonomous driving vehicle for transitioning from a semi-autonomous driving mode to a manual driving mode, the system comprising:
   a navigation system to determine a route to a destination;
   a vehicle head unit to receive data that comprises information related to a geographic zone in which autonomous driving is discouraged or prohibited along the determined route to the destination;
   a processor to process the received data to determine if the semi-autonomous driving vehicle in autonomous driving mode is approaching a geographic zone in which autonomous driving is discouraged or prohibited;
   a means for notifying a driver which issues a notification to the driver of the semi-autonomous driving vehicle requesting the driver to manually drive the semi-autonomous driving vehicle in response to a determination that the semi-autonomous driving vehicle is approaching the geographic zone in which autonomous driving is discouraged or prohibited,
   wherein the semi-autonomous driving vehicle performs a minimal risk maneuver to prevent autonomous driving in a geographic zone in which autonomous driving is discouraged or prohibited in response to determining the driver is not assuming control of the semi-autonomous driving vehicle based on the driver not assuming control of the semi-autonomous driving vehicle in a second predetermined period of time after a warning notification warning that the semi-autonomous driving vehicle is approaching the geographic zone in which autonomous driving is discouraged or prohibited.

2. The system of claim 1, wherein the semi-autonomous driving vehicle issues the warning notification warning that the semi-autonomous driving vehicle is approaching the geographic zone in which autonomous driving is discouraged or prohibited after a first predetermined period of time in which the driver has not assumed control of the semi-autonomous driving vehicle.

3. The system of claim 1, wherein the geographic zone in which autonomous driving is discouraged or prohibited is at least one of static, dynamic, stationary, and/or mobile.

4. The system of claim 1, wherein the geographic zone in which autonomous driving is discouraged or prohibited changes in size depending on an event that varies with time.

5. The system of claim 1, wherein the received data is received from a mobile computing device or an application running on the mobile computing device.

6. The system of claim 1, wherein the geographic zone in which autonomous driving is discouraged or prohibited is established through a beacon system.

7. The system of claim 1, wherein the vehicle reengages autonomous driving mode after performing a minimal risk maneuver in response to a determination that doing so does not create a specified level of risk and the semi-autonomous driving vehicle is not within a geographic zone in which autonomous driving is discouraged or prohibited.

8. The system of claim 1, wherein the navigation system alters a determined navigation route based on information regarding geographic zones in which autonomous driving is discouraged or prohibited along the determined route to the destination.

9. The system of claim 1, wherein the data indicating a location of permanent geographic zones in which autonomous driving is discouraged or prohibited is stored in a database accessible by the head unit of the semi-autonomous driving vehicle.

10. A method for transitioning from a semi-autonomous driving mode to a manual driving mode, the method comprising:
receiving data at a head unit of an semi-autonomous driving vehicle, said data comprising information relating to a geographic zone in which autonomous driving is discouraged or prohibited along a determined route to a destination;
processing the data in a processor of the semi-autonomous driving vehicle when the semi-autonomous driving vehicle is in an autonomous driving mode to determine if the semi-autonomous driving vehicle is approaching a geographic zone in which autonomous driving is discouraged or prohibited; and
issuing a notification to a driver of the semi-autonomous driving vehicle requesting the driver to manually drive the semi-autonomous driving vehicle in response to a determination that the semi-autonomous driving vehicle is approaching the geographic zone in which autonomous driving is discouraged or prohibited,
wherein the semi-autonomous driving vehicle performs a minimal risk maneuver to prevent autonomous driving in a geographic zone in which autonomous driving is discouraged or prohibited in response to determining the driver is not assuming control of the semi-autonomous driving vehicle based on the driver not assuming control of the semi-autonomous driving vehicle in a second predetermined period of time after the warning notification warning that the semi-autonomous driving vehicle is approaching the geographic zone in which autonomous driving is discouraged or prohibited.

11. The method of claim 10, wherein the semi-autonomous driving vehicle issues a warning notification warning that the semi-autonomous driving vehicle is approaching the geographic zone in which autonomous driving is discouraged or prohibited after a first predetermined period of time in which the driver has not assumed control of the semi-autonomous driving vehicle.

12. The method of claim 10, wherein the geographic zone in which autonomous driving is discouraged or prohibited is at least one of static, dynamic, stationary, and/or mobile.

13. The method of claim 10, wherein the geographic zone in which autonomous driving is discouraged or prohibited changes in size depending on an event that varies with time.

14. The method of claim 10, wherein the received data is received from a mobile computing device or an application running on the mobile computing device.

15. The method of claim 10, wherein the geographic zone in which autonomous driving is discouraged or prohibited is established through a beacon system.

16. The method of claim 10, wherein the vehicle reengages autonomous driving mode after performing a minimal risk maneuver in response to a determination that doing so does not create a specified level of risk and the semi-autonomous driving vehicle is not within a geographic zone in which autonomous driving is discouraged or prohibited.

17. The method of claim 10, further comprising altering a determined navigation route by a navigation system included within the semi-autonomous driving vehicle based on information regarding geographic zones in which autonomous driving is discouraged or prohibited along the determined route to the destination.

18. The method of claim 10, wherein the data indicating a location of permanent geographic zones in which autonomous driving is discouraged or prohibited is stored in a database accessible by the head unit of the semi-autonomous driving vehicle.

* * * * *